United States Patent [19]
Mun et al.

[11] Patent Number: 6,094,213
[45] Date of Patent: Jul. 25, 2000

[54] COMPUTER CONFERENCE SYSTEM WITH VIDEO PHONE CONNECTING FUNCTION

[75] Inventors: Byung-Do Mun; Kyun-Hoe Park, both of Suwon, Rep. of Korea

[73] Assignee: SamSung Electronics Co., Ltd., Suwon, Rep. of Korea

[21] Appl. No.: 09/058,558

[22] Filed: Apr. 13, 1998

[30] Foreign Application Priority Data

Apr. 12, 1997 [KR] Rep. of Korea ...................... 97-13520

[51] Int. Cl.$^7$ ......................................... H04N 7/14
[52] U.S. Cl. ...................... 348/15; 379/93.21; 379/90.01
[58] Field of Search .............................. 379/90.01, 93.17, 379/93.21, 102.06, 167, 53, 54; 348/14, 15, 143, 156

[56] References Cited

U.S. PATENT DOCUMENTS

| | | |
|---|---|---|
| 4,054,908 | 10/1977 | Poirier et al. . |
| 4,485,400 | 11/1984 | Lemelson et al. . |
| 4,715,059 | 12/1987 | Cooper-Hart et al. . |
| 4,943,997 | 7/1990 | Chang ................................. 379/102.06 |
| 5,014,267 | 5/1991 | Tompkins et al. . |
| 5,142,604 | 8/1992 | Lee .......................................... 348/156 |
| 5,351,076 | 9/1994 | Hata et al. ................................ 348/14 |
| 5,374,952 | 12/1994 | Flohr . |
| 5,379,280 | 1/1995 | Cotton et al. . |
| 5,491,797 | 2/1996 | Thompson et al. . |
| 5,512,938 | 4/1996 | Ohno . |
| 5,587,928 | 12/1996 | Jones et al. . |
| 5,684,528 | 11/1997 | Okutsu et al. . |
| 5,717,379 | 2/1998 | Peters ...................................... 348/143 |

FOREIGN PATENT DOCUMENTS

| | | | |
|---|---|---|---|
| 0505913A1 | 3/1992 | European Pat. Off. ....... H04M 11/12 |
| 403280772A | 12/1991 | Japan .............................. H04M 3/12 |

*Primary Examiner*—Curtis A. Kuntz
*Assistant Examiner*—Melur Ramakrishnaiah
*Attorney, Agent, or Firm*—Robert E. Bushnell, Esq.

[57] ABSTRACT

A video conference system used in home automation for performing audio and video conferencing between a personal computer and a video phone as well as remote conference system. The personal computer stores audio/video information of the visitor supplied from the video phone and automatically connects with the remote conference system in response to a bell signal input of the visitor. A subsystem is installed in the video phone for supplying audio/video data of the visitor to a main control system for receiving audio/video information transmitted from the remote conference system over a communication network.

11 Claims, 7 Drawing Sheets

COMPUTER CONFERENCE SYSTEM WITH VIDEO PHONE CONNECTING FUNCTION

CLAIM FOR PRIORITY

This application makes reference to, incorporates the same herein, and claims all benefits accruing under 35 U.S.C. §119 from an application for a Computer Conference System with Video Phone Connecting Function earlier filed in the Korean Industrial Property Office on Apr. 12, 1997, and there duly assigned Serial No. 13520/1997, a copy of which application is annexed hereto.

BACKGROUND OF THE INVENTION

1. Technical Field

The present invention relates to a computer conference system, and more particularly to audio and video conferencing between a computer system having a video phone connected thereto and a remote computer conference system.

2. Related Art

Video phones are known for enabling both video and audio communications between users over a commonly connected telephone line. Examples of video phones are disclosed in U.S. Pat. No. 4,485,400 for Video Telephone issued to Lemelson et al., and U.S. Pat. No. 4,715,059 for Conversational Video Phone issued to Cooper-Hart et al. Some video phones are widely used for home and office buildings for identifying visitors outside the door. For example, when a visitor presses a bell button located at the door, a camera installed outside the door captures an image of the visitor, and the video image is transmitted to the video phone installed inside the house or an office building where the video image is restored for a visual display on a monitor. If necessary, interphone may be installed to communicate with the visitor. However, such video phones cannot record messages of visitors when the residents are away from home. In this situation, even if there is an emergency, the visitor cannot contact the resident, and has no way of learning of his whereabout.

Other communication systems that are closely related with those video phones are home automation systems, and video conference systems such as disclosed in U.S. Pat. No. 4,054,908 for Video Telephone Conference System issued to Poirier et al., U.S. Pat. No. 5,014,267 for Video Conferencing Network issued to Tompkins et al., U.S. Pat. No. 5,351,076 for Terminal System Having Video Telephone Equipment Cooperating With Computer System issued to Hata et al. U.S. Pat. No. 5,374,952 for Video Conferencing System issued to Flohr, U.S. Pat. No. 5,379,280 for Conferencing System For Distributed Switching Network issued to Cotton et al., and U.S. Pat. No. 5,491,797 for Schedulable Automatically Configured Video Conferencing System issued to Thompson et al., U.S. Pat. No. 5,512,938 for Teleconference Terminal issued to Ohno, and U.S. Pat. No. 5,587,928 for Computer Teleconferencing Method And Apparatus issued to Jones et al.

For home automation systems which use personal computers for automating home communication electronics, each video phone is connected thereto for the convenience of the user. A personal computer with a camera, a microphone, a monitor, and a speaker are used to establish audio and video conferencing with the video phone. Generally, when a bell rings from the video phone, the home automation system determines whether the personal computer is activated for connection with the video phone to establish video conferencing with the visitor.

For computer conference systems which provide real-time audio, video, and data conferencing between personal computers such as disclosed, for example, in U.S. Pat. No. 5,351,076, U.S. Pat. No. 5,512,938, and U.S. Pat. No. 5,587,928, a conferencing system, a camera, a microphone, a monitor, and a speaker are installed to receive, digitize, and compress analog video and audio information for transmission to a remote conference system via a communications network such as a private switched telephone network (PSTN) and an integrated services digital network (ISDN). Each conference system may generate and transmit video and audio information to the other conferencing system for play on its respective monitor.

Since video phones, which are used for home and office buildings for identifying visitors outside the door, cannot record messages of visitors and nor provide useful information of residents when the residents are away from home, and since home automation systems are unable to remedy these problems, we have noted that there is a need to incorporate a home automation system with a video phone into a computer conference system in order to efficiently and effectively facilitate video and audio communications between the PC user and the visitor.

SUMMARY OF THE INVENTION

Accordingly, it is therefore an object of the present invention to provide a new and novel computer conference system for home automation.

It is also an object to provide a computer conference system which can provide video and audio conferencing between a personal computer connected to a video phone and a remote conference system designated by the user over a communication network.

It is another object to provide a computer conferencing system which can store an audio message, video image, and related information of a visitor supplied from a video phone.

These and other objects of the present invention can be achieved by a computer conference system for establishing audio and video conferencing between a computer connected with a video phone and a remote conference system over a communication network. The computer conference system comprises a main control system for storing audio/video information of a visitor supplied from the video phone and for automatically connecting the computer with the remote conference system at a remote location over a communication network in response to a bell signal input of the visitor; and a subsystem for supplying audio/video information of the visitor the main control system and for receiving audio/video information transmitted from the remote conference system.

In accordance with another aspect of the invention, a method of performing video and audio conferencing between a computer system connected to a video phone and a remote computer conference system over a communication network, can be achieved by the steps of detecting a bell signal generated from the video phone when a visitor presses a bell button of the video phone; determining whether the computer system is in use; when the computer system is in use, permitting the computer system to enter a remote conference mode; when the computer system is not in use, waking-up the computer system, and determining whether the computer system is set in the remote conference mode; when the computer system is set in the remote conference mode, entering a predetermined remote connection routine for automatically establishing video and audio conferencing with the remote conference system over the communication network; and when the computer system is not set in the remote conference mode, storing video/audio information of the visitor supplied from the video phone system in a memory.

The remote connection routine comprises: reading remote conference setup data stored in said memory set by a user; establishing a dial-up connection with the remote conference system through a modem using said remote conference setup data; determining whether the dial-up connection is established within a preset time interval; performing audio/video conferencing between the visitor and a called party at the remote conference system over the communication network; and permitting the computer system to return to a hibernation mode when the computer conferencing is completed.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
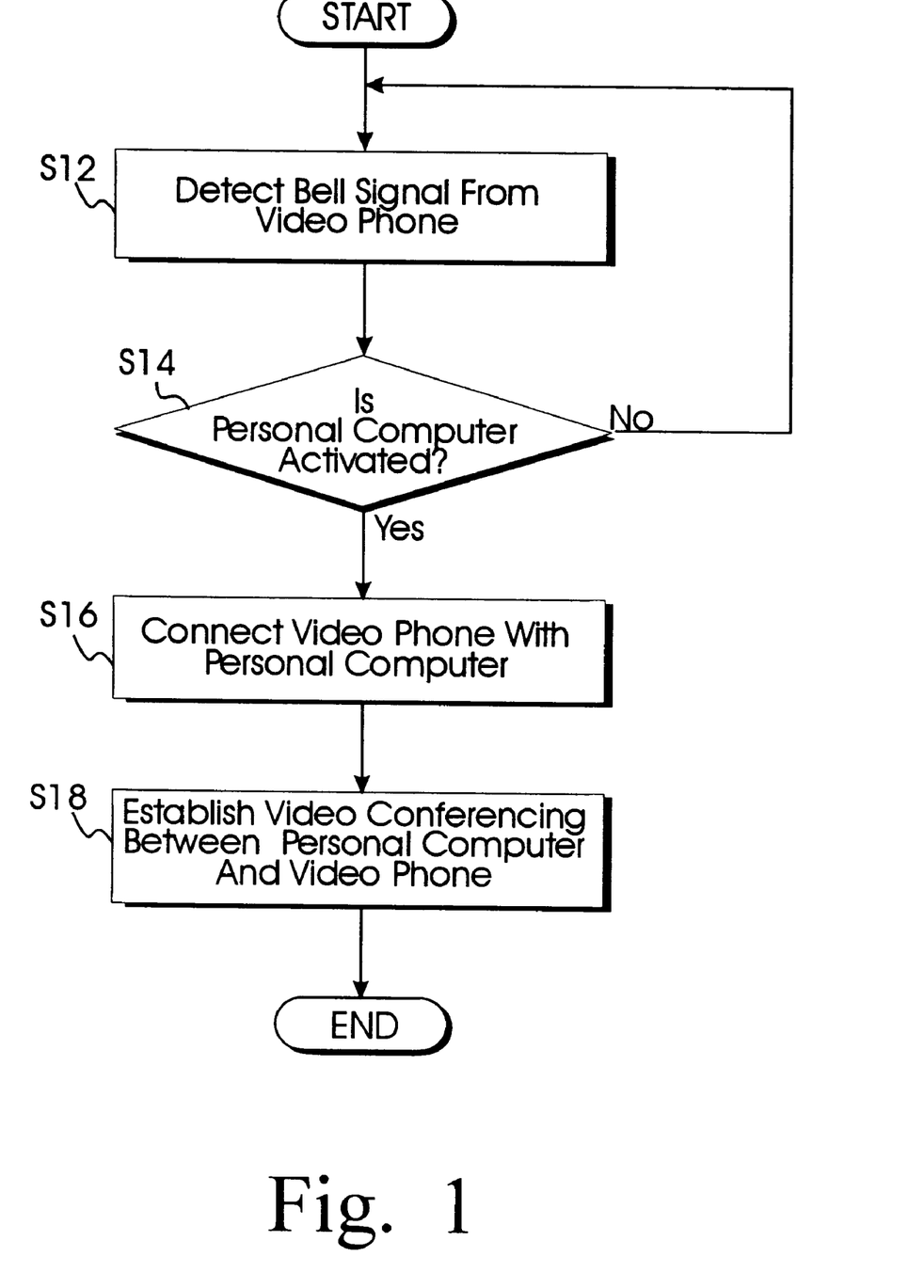
FIG. 1 is a flowchart of a typical video conferencing method performed by a home automation system with a video phone.

Referring now to the drawings and particularly to FIG. 1, which illustrates a typical video conferencing method performed by a home automation system with a video phone for identifying visitors outside the door of home or an office building. As shown in FIG. 1, when a bell signal indicating a bell input from the visitor is detected from the video phone at step 12, the home automation system determines whether a personal computer is activated at step 14. If the personal computer is activated, the home automation system connects the video phone with the personal computer system at step 16. Then, video conferencing between the personal computer and the video phone can be established at step 18.

Since video phones, which are used for home and office buildings for identifying visitors outside the door, cannot record messages of visitors and nor provide useful information of residents when the residents are away from home, and since home automation systems are unable to remedy these problems as we have described, there is a need to incorporate a home automation system with a video phone into a computer conference system in order to efficiently and effectively facilitate video and audio communications between the PC user and the visitor, particularly when the PC user is not home.

Figure 2:
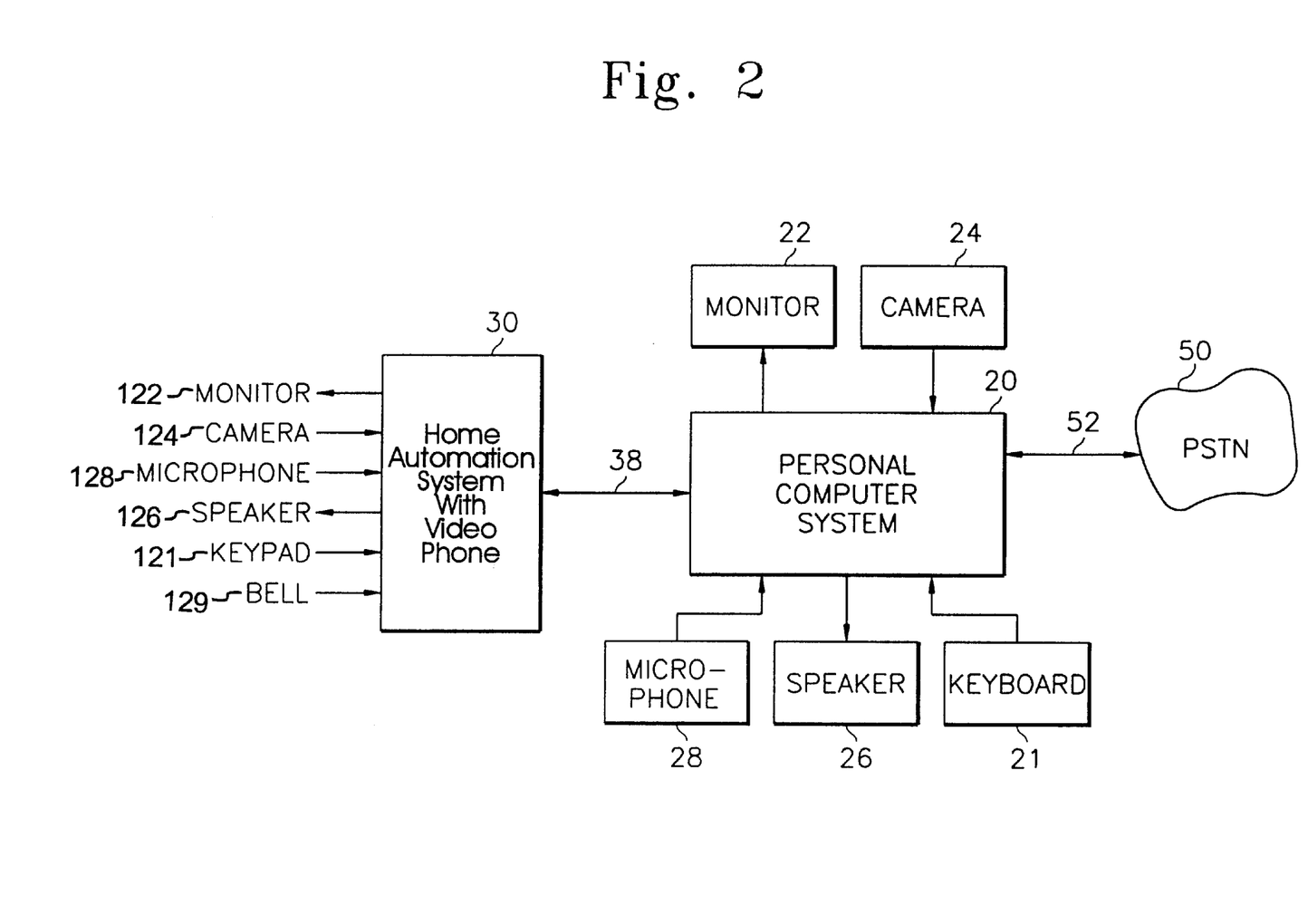
FIG. 2 is a block diagram of a computer conference system for use in home automation for establishing video and audio conferencing between a personal computer, a video phone and a remote conference system over a communication network according to the principles of the present invention.

Turning now to FIG. 2, which illustrates a computer conference system used for home automation for establishing video and audio conferencing between a personal computer, a video phone and a remote conference system over a communication network according to the principles of the present invention. As shown in FIG. 2, the computer conference system includes a personal computer (PC) 20 with a monitor 22, a camera 24, a microphone 28, a speaker 26 and a keyboard 21, and a home automatic system with video phone 30 installed outside the door via a signal transmission line 38, and a monitor 122, a camera 124, a microphone 128, a speaker 126, a key pad 121, and a bell button 129 for audio and video conferencing.

The personal computer 20 connected to the home automation system with video phone 30 further includes a conferencing system that receives, digitizes, and compresses analog video information from the camera 24 and analog audio information from the microphone 28. The conferencing system of the personal computer 20 is connected with a communication network 50 such as PSTN and ISDN via a telephone line 52. Over the communication network 50, the personal computer 20 of the computer conference system can be connected with a remote conference system.

Figure 3:
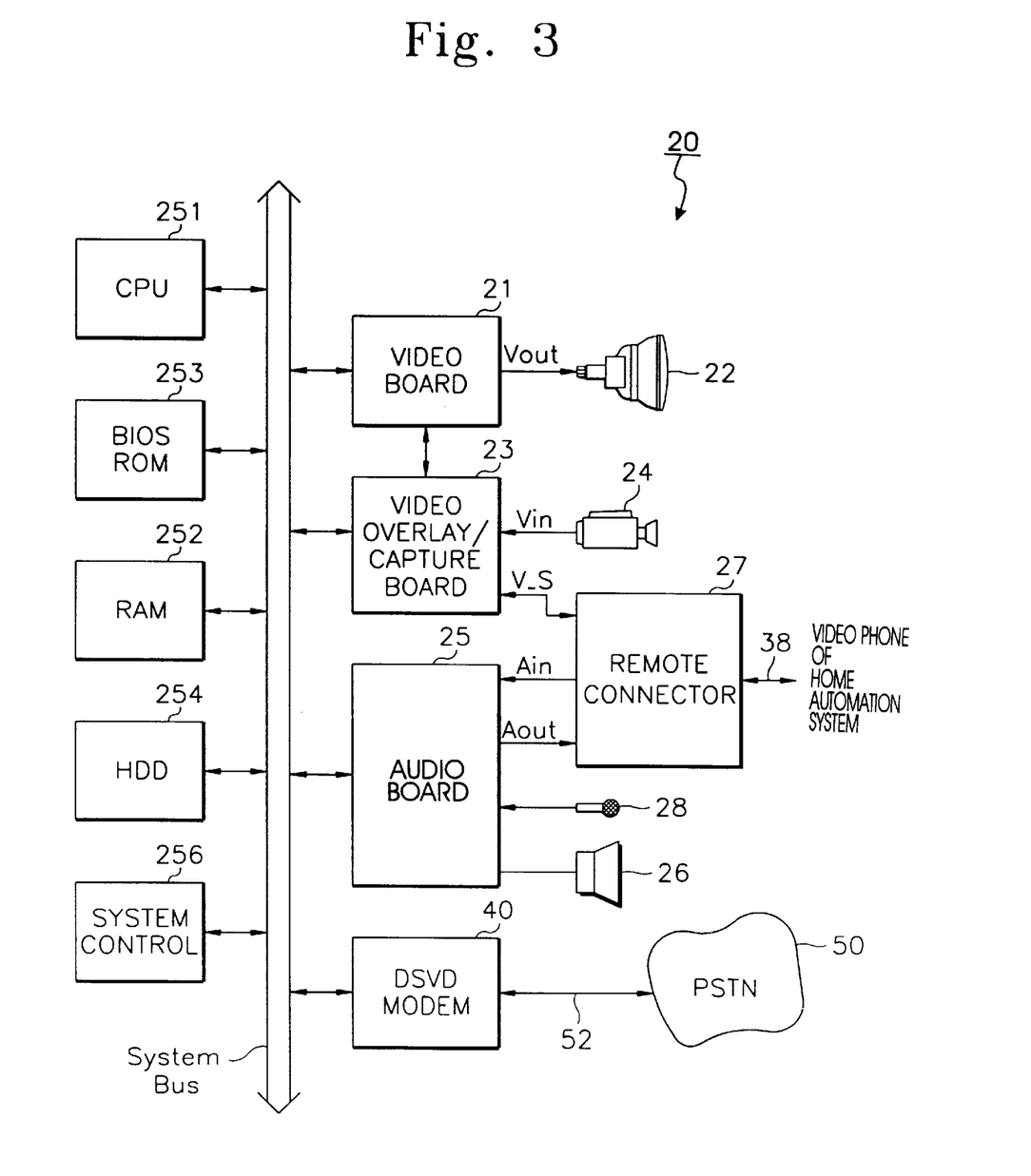
FIG. 3 is a detailed block diagram of a personal computer of the computer conference system as shown in FIG. 2.

FIG. 3 illustrates a detailed configuration of the personal computer 20 of the computer conference system as shown in FIG. 2. The personal computer 20 has a video board 21 supporting a CRT monitor 22, a video overlay/capture board 23 supporting a CCD camera 24, an audio board 25 supporting a speaker 26, a remote connector 27 which is connected to the home automatic system with video phone 30, and a microphone 28, and a communication board 40, all of which are operably connected with a system bus along with a central processing unit (CPU) 251, a BIOS read-only-memory (ROM) 253, a random-access-memory (RAM) 252, a hard disk drive (HDD) 254 and a system controller 256.

The remote connector 27 interfaces the audio and video input signals supplied from the home automation system with video phone 30. The video board 21 has a video output terminal for providing a visual display of video information through the monitor 22. The video overlay/capture board 23 has video input terminals connected to the CCD camera 24 and the remote connector 27. The audio board 25 includes audio input and output terminals connected to the microphone 28 and speaker 26 respectively. Also provided are auxiliary audio input and output terminals to connect the audio input/output of the remote connector 27. The communication board 40 may consist of a DSVD (Digital Simultaneous Voice and Data) modem that allows the simultaneous transmission of video and audio information over a single dial-up telephone line.

Figure 4:
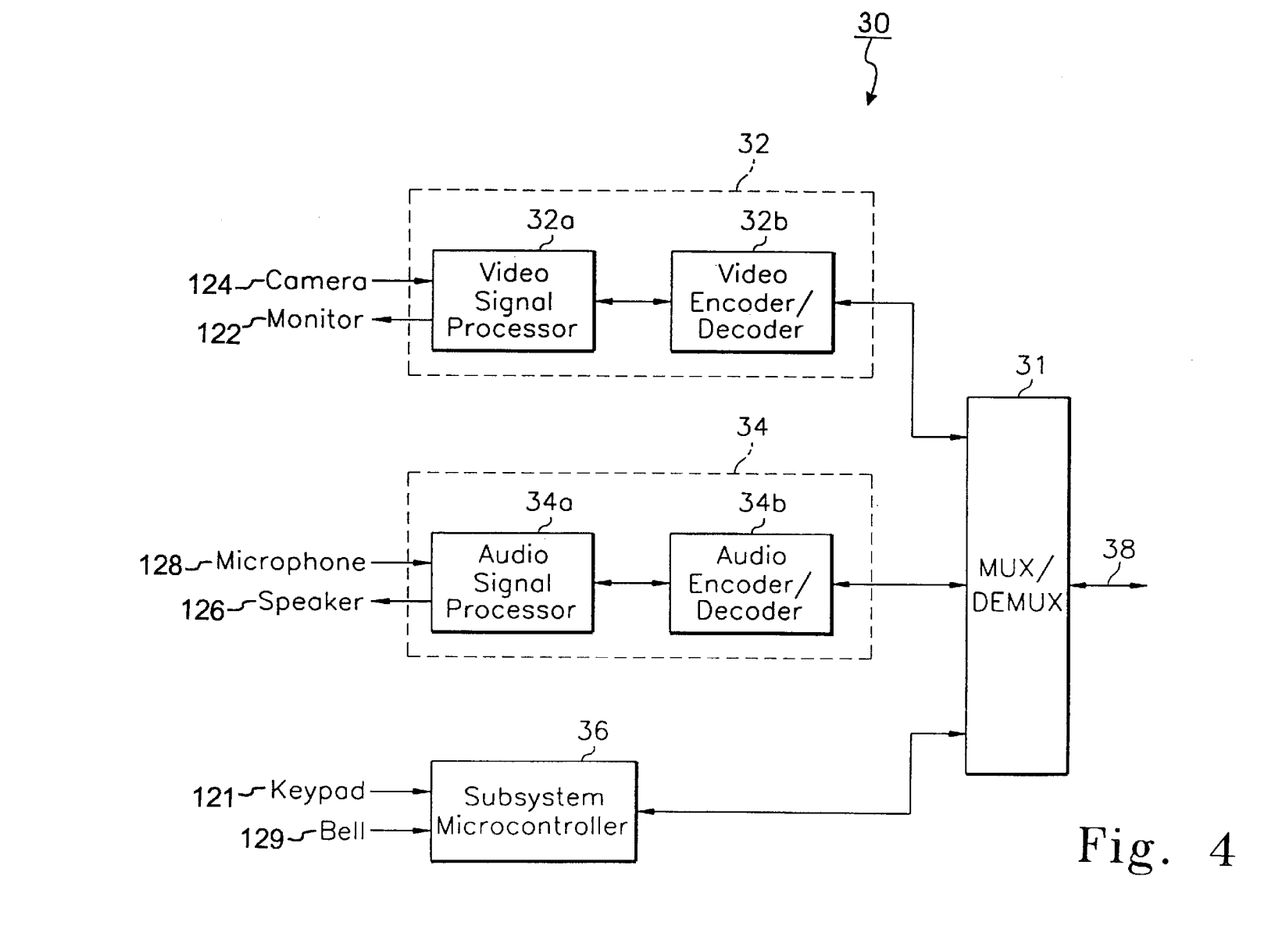
FIG. 4 is a detailed block diagram of a home automation system with a video phone of the computer conference system as shown in FIG. 2.

FIG. 4 illustrates a detailed configuration of the home automation system with video phone 30 of the computer conference system as shown in FIG. 2. The home automation system with video phone 30 includes a video board 32, an audio board 34, a microcontroller 36 and a multiplexer/demultiplexer 31. The video board 32 includes a video signal processor 32a and a video encoder/decoder 32b, which receives video image generated from the camera 124 and outputs analog video signal to the monitor 122. The audio board 34 includes an audio signal processor 34a and an audio encoder/decoder 34b, which receives analog audio signal from the microphone 128 and outputs audible signal to the speaker 126. Audio board 34 and video board 32 digitize analog audio signals and video signals received from microphone 128 and camera 124, respectively. The digital audio and video information are stored in memories and they are converted into compressed audio and video format for transmission. The formatted audio and video information are transmitted to the remote connector 27 via the multiplexer 31 under control of the microcontroller 36. Also, the microcontroller 36 generates specific key signals and a bell signal in response to key input of the key pad 121 and the bell button 129, respectively. These signals are also transmitted to the remote connector 27 and function as a wake-up signal of the personal computer 20. Further, the multiplexer/demultiplexer 31 interfaces digitally compressed and formatted audio and video data generated by the audio board 34, video board 32 with the remote connector 27 of the personal computer 20.

During conferencing, audio board 25 and video board 21 of the personal computer 20 as well as the video board 32 and audio board 34 of the video phone system 30 digitize analog audio signals and video signals received from the respective microphones 28 and 128 and cameras 24 and 124. Usually, the digital audio and video information are stored in memories and they are converted into compressed audio and video format for transmission. The formatted audio and video information are received from and transmitted to the video phone 30 via the remote connector 27. Also, the formatted audio and video information can be transmitted to the communication board 40 for transmission to the remote conferencing system over a communication network. Also, the data generated by the host home automation system with video phone 30 is formatted for transmission to a remote site over a communication network.

Figure 7:
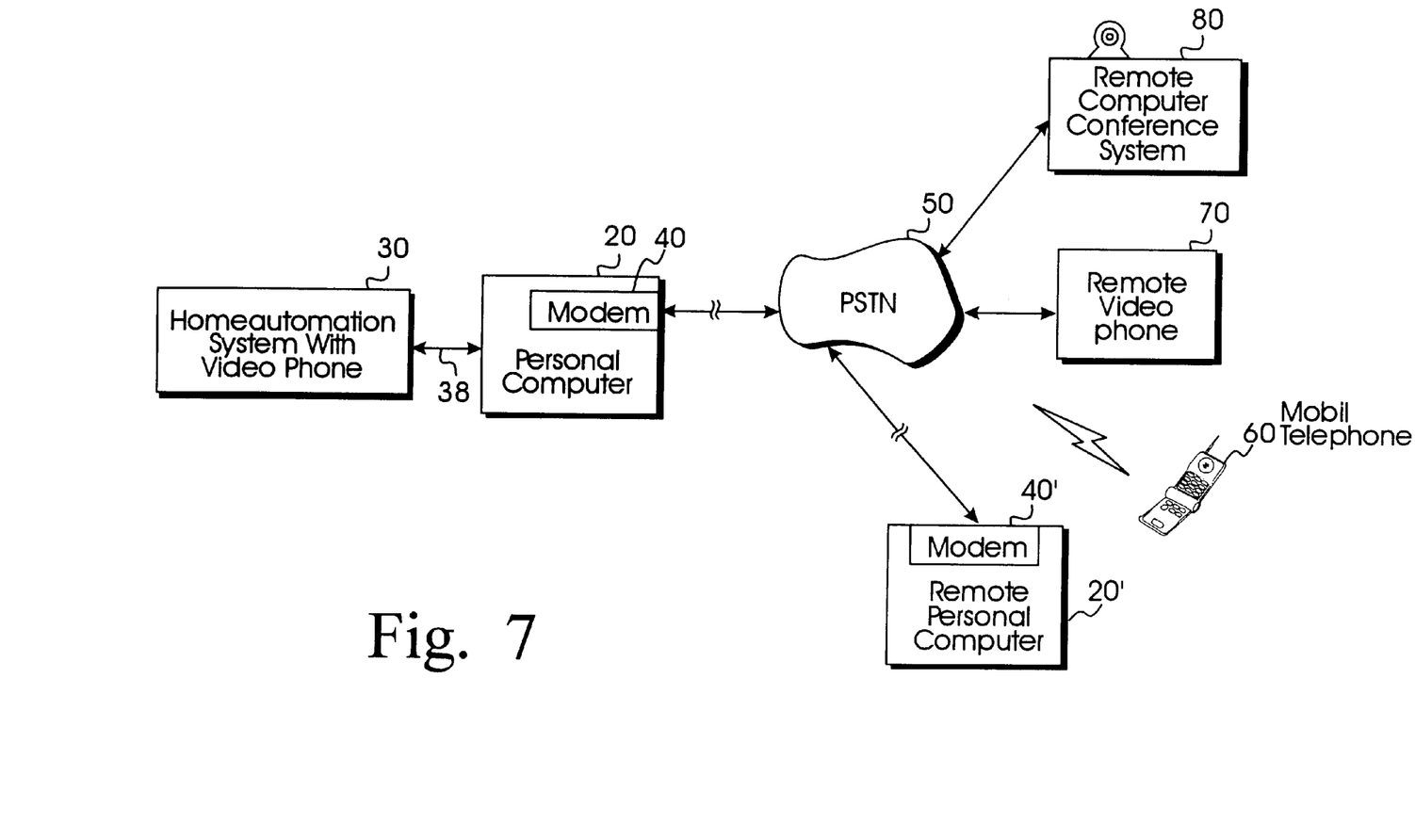
FIG. 7 is a block diagram depicting audio and video conferencing between the computer conference system and a remote computer conferencing system via a communication network.

The communication board 40 also receives from the communications network 50 compressed digitally formatted audio/video/data generated by the remote site. Each data format is reconstructed and transmitted to the respective boards via ISA bus interface. Then decompression and digital-to-analog conversion of the decompressed data are performed for local playback. Referring to FIG. 7, there is illustrated examples of a remote conference system, which may include a remote personal computer 20', a remote computer conference system 80, a remote video phone 70, and a mobile telephone 60.

In the preferred embodiment of the present invention, the audio and video conferencing is performed between the video phone 30 and the personal computer 20 of the computer conference system as well as between the personal computer 20 of the computer conference system and the remote personal computer 20' via the communications network 50.

Figure 5:
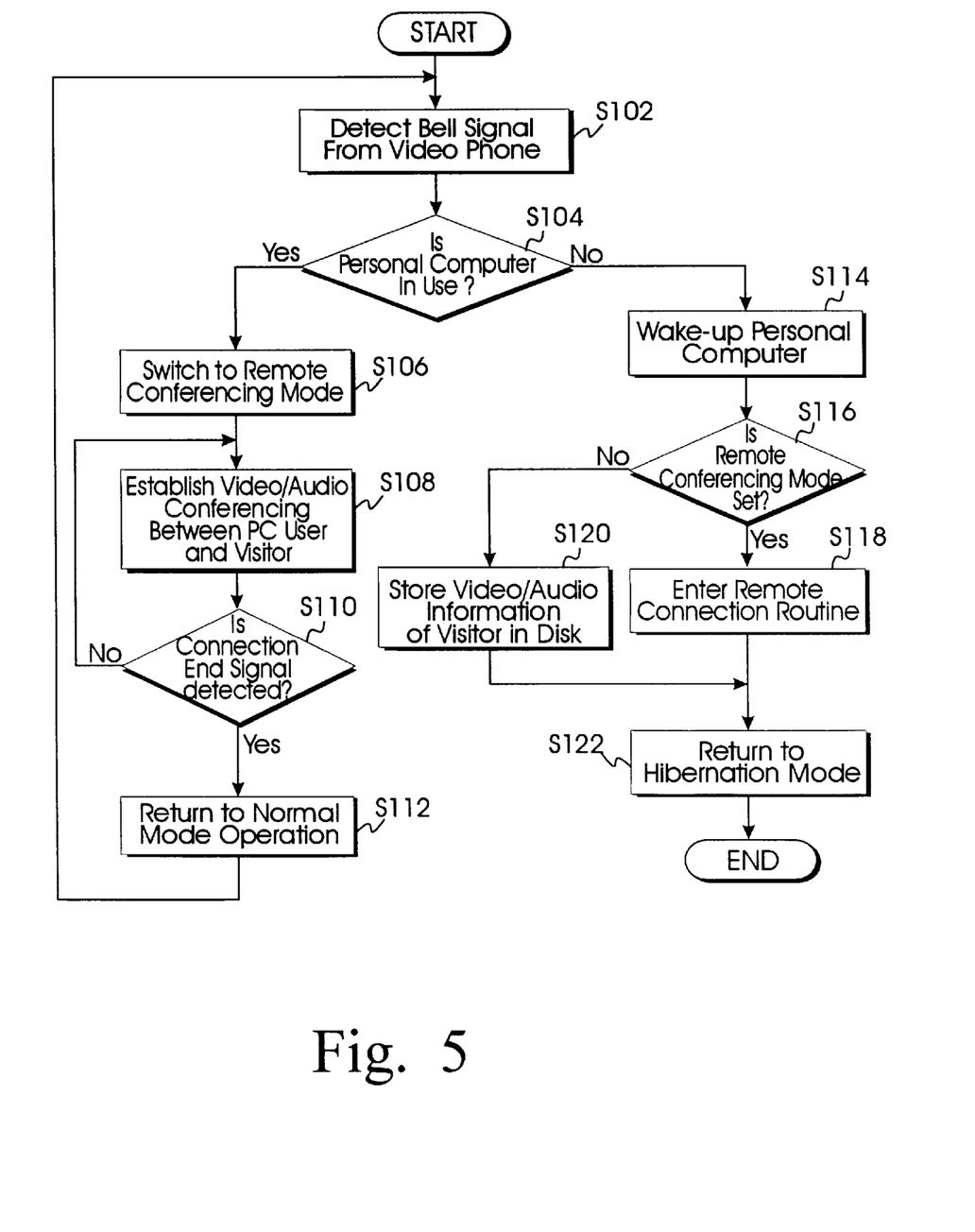
FIG. 5 is a flowchart illustrating a main control routine of the computer conference system according to the principles of the present invention.

Now, a main control routine of the computer conference system according to the principles of the present invention will now be described with reference to FIG. 5 hereinbelow.

First, the remote connector 27 of the personal computer (PC) 20 of the computer conference system detects a bell signal generated in the home automation system with video phone 30 when a visitor presses the bell button 129 of the video phone 30 at step S102. The remote connector 27 checks the status of the personal computer (PC) 20 at step S104, that is, whether the personal computer (PC) 30 is in use or not. If the personal computer (PC) 20 is in use, the remote connector 27 allows the personal computer (PC) 20 to switch to a remote conferencing mode at step S106. Then, audio and video conferencing between the personal computer (PC) 20 and the video phone 30 is established and performed at step S108. During conferencing, the remote connector 27 checks if a connection end signal from the video phone 30 is detected at step S110. If the conferencing is completed, the remote connector 27 permits the personal computer (PC) 20 to return to a normal mode of operation and resume previous computer operation at step S112.

If, on the other hand, the personal computer (PC) 20 is not in use at step S104, that is, the personal computer (PC) 20 is in either a suspend mode or a hibernation mode of power management operation, the video board 21 of the personal computer (PC) 20 responds to the bell signal from remote connector 27 and this will functions as a wake-up signal to activate the personal computer (PC) 20 for normal operation at step S114. Then, the remote connector 27 checks if the personal computer (PC) 20 is set to a remote conferencing mode at step S116. A video conferencing program may allow the PC user to set the personal computer (PC) 20 to enter into a remote conferencing mode in response to the bell signal from the visitor outside the door of a home or an office building. If the remote conferencing mode is set in the personal computer (PC) 20 by the PC user, the personal computer (PC) 20 enters a predetermined remote connection routine at step S118. The remote connection routine will be described later with reference to FIG. 6.

If the remote conferencing mode is not set in the personal computer (PC) 20 by the PC user, the personal computer 20 stores video/audio data of the visitor into the hard disk drive (HDD) 254 supplied from the home automation system with video phone 30 at step S120. After storing the video/audio information of the visitor, the personal computer (PC) 20 returns to the previous hibernation mode (or suspend mode) at step S122.

Figure 6:
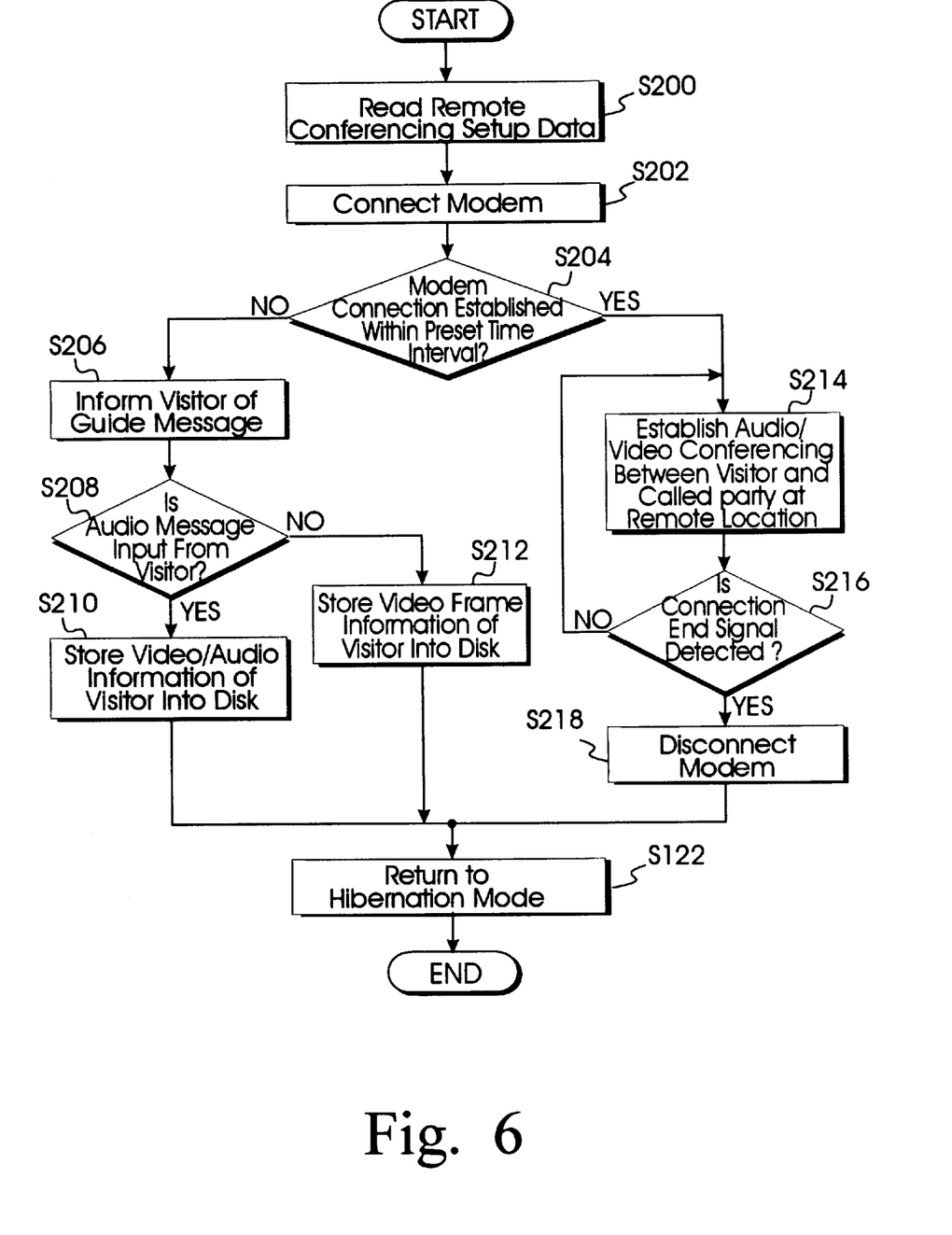
FIG. 6 is a flowchart illustrating a remote connection routine of FIG. 5.

The remote connection routine is set by the PC user for enabling computer conferencing between the personal computer (PC) 20 of the computer conference system and the remote conferencing system designated by the user. This remote connection routine is necessary for the PC user to acknowledge the presence of the visitor in the event that he/she is not available at home or office for video conferencing with the visitor. When the remote connection routine is setup, audio/video conferencing can be automatically established between the visitor and the PC user or other designated called party at a remote location over a communication network.

As shown in FIG. 6, the remote connection routine is initiated at step S200 by reading remote conferencing setup data stored in the personal computer (PC) 20 preprogrammed by the PC user. The remote conferencing setup data may include an area code, a telephone number of the PC user or a designated called party at a remote location over a communication network, by which a dial-up connection can be established through a modem at step S202. When the modem connection (e.g., dial-up connection) is established within a preset time interval at step S204, the personal computer (PC) 20 establishes the audio/video conferencing between the visitor and the designated called party at a remote location at step S214. During conferencing, the personal computer (PC) 20 periodically checks if the connection end signal indicating termination of the conference is detected at step S216. If the computer conferencing is completed, the modem is disconnected at step S218 and the personal computer (PC) 20 returns to the hibernation mode at step S 122 as shown in FIG. 5.

Meanwhile, if the dial-up connection fails to establish within the preset time interval at step S204, the personal computer (PC) 20 retrieves a guide message stored in an internal memory and provides the guide message to the visitor at step 206. According to the guide message, the personal computer (PC) 20 determines if an audio message from the visitor is input through the home automation system with video phone 30. If the audio message from the visitor is input through the home automation system with video phone 30, the personal computer (PC) 20 stores the video/audio data of the visitor into the hard disk drive (HDD) 254 at step S210. If there is no audio message from the visitor at step S208, the personal computer (PC) 20 stores only video frame data of the visitor taken by the camera 24 at step S212. Then the personal computer (PC) 20 returns to the hibernation mode at step S122.

As described above, the computer conference system of the present invention advantageously permits audio and video conferencing between a personal computer connected to a video phone and a remote conference system designated by the user. In addition, the computer video conference system is capable of storing an audio message, video image, and related information of the visitor supplied from the video phone for future acknowledgment.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer conference system for establishing two way audio and video conferencing between a computer, connected to a video phone, and a remote conference system over a communication network, the computer conference system comprising:

a main control system for storing audio/video information of a visitor supplied from the video phone and for automatically connecting the computer to the remote conference system at a remote location over a communication network in response to a bell signal input by the visitor via the video phone; and a subsystem for supplying audio/video information of the visitor to the main control system and for receiving audio/video information transmitted from the remote conference system over said communication network to the visitor via the video phone;

wherein said main control system detects a bell signal generated by the video phone when a visitor presses a bell button of the video phone, and checks whether the computer system is in use;

when the computer system is in use, said main control system causes the computer system to enter a remote conference mode;

when the computer system is not in use, said main control system wakes up the computer system, and determines whether the computer system is set to the remote conference mode;

when the computer system is set to the remote conference mode, said main control system enters a predetermined remote connection routine for automatically establishing video and audio conferencing with the remote conference system over said communication network; and when the computer system is not set in the remote conference mode, said main control system stores the video/audio information of the visitor supplied from the video phone system in a memory.

2. The computer conference system of claim 1, said main control system comprising:

a remote connector for generating an enable signal in response to the bell signal input from the video phone;

an audio board for outputting an audio message to the subsystem in response to the enable signal;

a video board for overlaying/capturing a video image of the visitor for a visual display in response to the enable signal; and a communication board coupled to the audio board and to the video board via a bus, and connected to the remote conference system via said communication network.

3. The computer conference system of claim 1, said subsystem comprising:

an audio board having an audio input connected to a microphone and having an audio output connected to a speaker;

a video board having a video input from a camera and a video output connected to a monitor; and a multiplexer/demultiplexer for interfacing audio information and video information generated by the audio board and the video board, respectively.

4. A method of performing video and audio conferencing between a computer system connected to a video phone and a remote computer conference system over a communication network, said method comprising the steps of:

detecting a bell signal generated by the video phone when a visitor presses a bell button of the video phone;

checking whether the computer system is in use;

when the computer system is in use, causing the computer system to enter a remote conference mode;

when the computer system is not in use, waking up the computer system, and determining whether the computer system is set to the remote conference mode;

when the computer system is set to the remote conference mode, entering a predetermined remote connection routine for automatically establishing video and audio conferencing with the remote conference system over said communication network; and when the computer system is not set to the remote conference mode, storing video/audio information of the visitor supplied from a memory in the video phone.

5. The method of claim 4, said remote connection routine comprising the steps of:

reading remote conference setup data set by a user and stored in said memory;

establishing a dial-up connection with the remote conference system through a modem using said remote conference setup data;

determining whether the dial-up connection is established within a preset time interval;

performing audio/video conferencing between the visitor and a called party at the remote conference system over said communication network; and causing the computer system to return to a hibernation mode when the computer conferencing has been completed.

6. The method of claim 4, further comprising the steps of:

storing audio/video information of the visitor supplied from the video phone and automatically connecting the computer system to the remote conference system at a remote location over a communication network in response to the bell signal input of the visitor; and supplying audio/video information of the visitor to the main control system and receiving audio/video information transmitted from the remote conference system over said communication network.

7. The method of claim 6, further comprising the steps of:

generating an enable signal in response to the bell signal input from the video phone;

outputting an audio message to the subsystem in response to the enable signal; and overlaying/capturing a video image of the visitor for a visual display in response to the enable signal.

8. The method of claim 7, further comprising the steps of:

receiving an audio input from a microphone and providing an audio output to a speaker;

receiving a video input from a camera and providing a video output to a monitor; and interfacing audio and video information.

9. A two way video conference system, comprising:

a subsystem for generating digitized audio/video signal of a visitor based on input of audio/video signal from a video phone; and a main control system for storing audio/video information of the visitor supplied from the subsystem and for connecting a computer system to a remote conference system located at a remote site over a communication network, said main control system including a remote connector for transmitting audio/video data received from the subsystem to the remote conference system in response to a bell signal input by the visitor via the video phone;

wherein said main control system detects a bell signal generated by the video phone when a visitor presses a bell button of the video phone, and checks whether the computer system is in use;

when the computer system is in use, said main control system causes the computer system to enter a remote conference mode;

when the computer system is not in use, said main control system wakes-up the computer system, and determines whether the computer system is set to the remote conference mode;

when the computer system is set to the remote conference mode, said main control system enters a predetermined remote connection routine for automatically establishing video and audio conferencing with the remote conference system over said communication network; and when the computer system is not set in the remote conference mode, said main control system stores the video/audio information of the visitor supplied from the video phone system in a memory.

10. The video conference system of claim 9, said main control system comprising:

said remote connector generating an enable signal in response to the bell signal input from the video phone;

an audio board for outputting an audio message to the subsystem in response to the enable signal;

a video board for overlaying/capturing a video image of the visitor for a visual display in response to the enable signal; and a communication board coupled to the audio board and to the video board via a bus, and connected to the remote conference system via said communication network.

11. The video conference system of claim 10, said subsystem comprising:

an audio board having an audio input connected to a microphone and having an audio output connected to a speaker;

a video board having a video input from a camera and a video output connected to a monitor; and a multiplexer/demultiplexer for interfacing audio information and video information generated by the audio board and the video board, respectively.

* * * * *